United States Patent [19]

Booten et al.

[11] Patent Number: 5,024,304
[45] Date of Patent: Jun. 18, 1991

[54] VACUUM BRAKE FORCE BOOSTER WITH ACOUSTIC INSULATION

[75] Inventors: Sigmund Booten, Oberursel; Uwe Kley; Cristiano Hoffmann, both of Frankfurt am Main, all of Fed. Rep. of Germany

[73] Assignee: Alfred Teves GmbH, Frankfurt am Main, Fed. Rep. of Germany

[21] Appl. No.: 450,129

[22] Filed: Dec. 13, 1989

[30] Foreign Application Priority Data

Jan. 9, 1989 [DE] Fed. Rep. of Germany ....... 3900416

[51] Int. Cl.$^5$ .......................................... B60T 13/52
[52] U.S. Cl. .................. 188/356; 60/547.1; 91/376 R; 188/357
[58] Field of Search ............................ 363/4, 12, 114; 188/356, 357; 60/547.1; 91/376 R, 369.1, 369.2, 369.3, 369.4

[56] References Cited

U.S. PATENT DOCUMENTS 2,767,548 10/1956 Ayers, Jr. ...................... 188/357 X
4,269,110 5/1981 Weiler ............................. 91/369.4

FOREIGN PATENT DOCUMENTS 3642760 6/1988 Fed. Rep. of Germany .

Primary Examiner—Matthew C. Graham
Attorney, Agent, or Firm—Robert P. Seitter; J. Gordon Lewis

[57] ABSTRACT

To substantially eliminate the noise arising upon actuation of a vacuum brake force booster caused by incoming air, the housing section confining the ventable working chamber and/or the intervals in the control valve housing are lined with an insulating composition for attenuating noise.

23 Claims, 2 Drawing Sheets

VACUUM BRAKE FORCE BOOSTER WITH ACOUSTIC INSULATION

BACKGROUND OF THE INVENTION

1. Field of the Invention

The invention generally relates to vacuum brake force boosters for use with automotive vehicles. More particularly, the invention relates to a vacuum brake force booster comprising a booster housing consisting of two housing sections and, through an axially movable partition, being sealingly subdivided into a vacuum chamber and a vented working chamber, and comprising a control valve mechanically actuable by a control piston, for establishing communication between the working chamber and the vacuum chamber and the atmosphere, respectively, with the axially movable control valve housing thereof being made of thermoplastic material and, in the guiding area of the control piston, comprising a plurality of cylinder segment-shaped intervals spaced from one another by means of radial reinforcing bridges.

2. Brief Description of the Related Art

A vacuum brake force booster of the aforedescribed type is known, for example, from prior published German Patent DE-OS 36 42 760. The disadvantage involved audible noise of the incoming air caused, upon actuation thereof, by the formation of eddies in the control valve area and by air incident on the booster housing sheeting, respectively.

It is, therefore, the object of the present invention to improve a vacuum brake force booster of the aforementioned type to the effect that the noise caused by the underlying principle of construction is substantially eliminated.

SUMMARY OF THE INVENTION

The aforementioned problems of the prior art are solved in the practice of the present invention, by lining the housing section confining the ventable working chamber and/or the intervals with an attenuating material.

As a result of these measures, the noise level of the in-flowing air upon actuation of the vacuum brake force booster is substantially lowered, and the resonance pattern of the control valve housing as well as the circulation of the current of air within the control valve housing, respectively, are under a positive influence.

Further features, advantages and fields of end-use application of the invention will become apparent from the following description of two forms of embodiment with reference to the accompanying Drawing.

DETAILED DESCRIPTION

Figure 1:
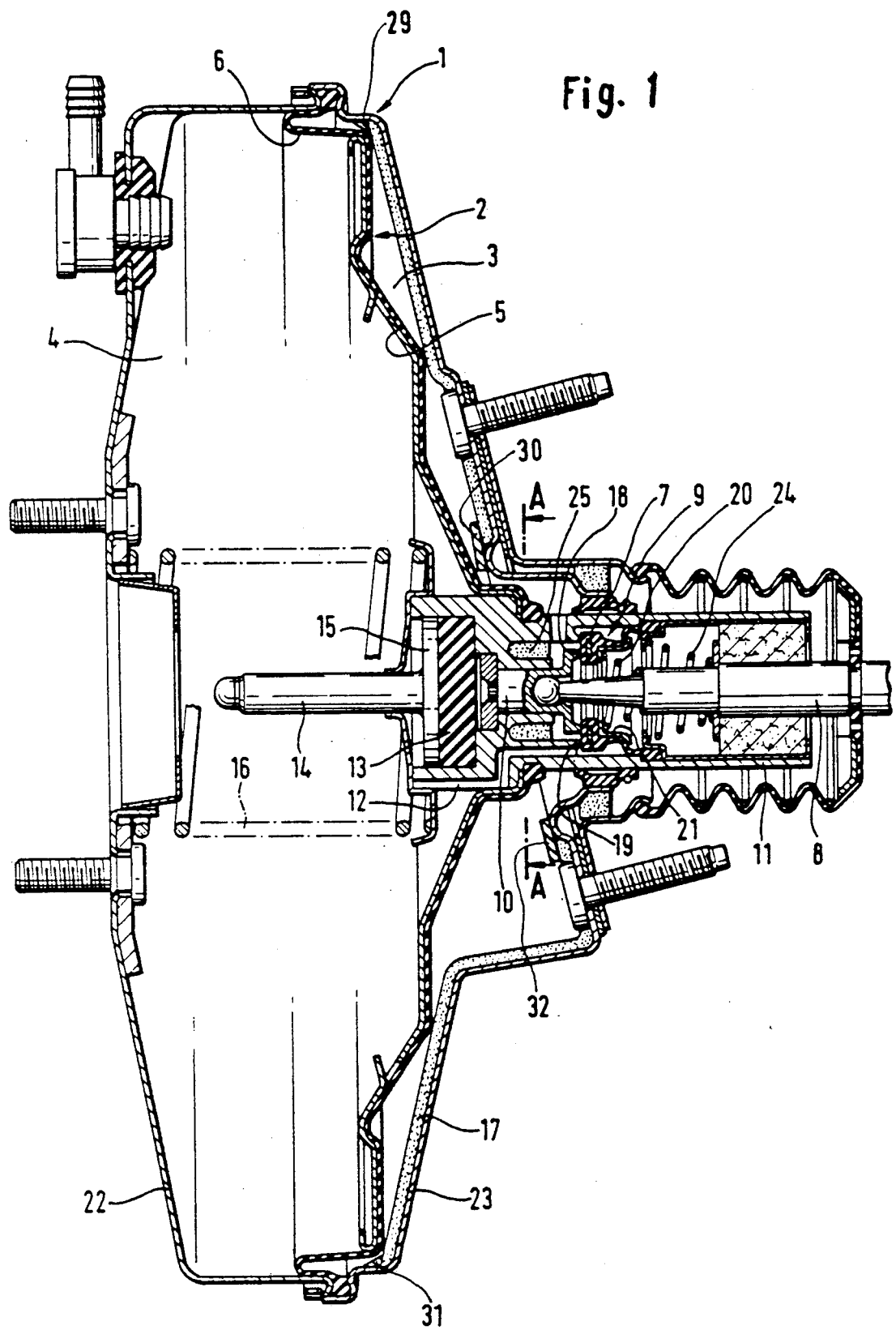
FIG. 1 illustrates a longitudinal section through a vacuum brake force booster according to one embodiment of the invention.
Figure 2:
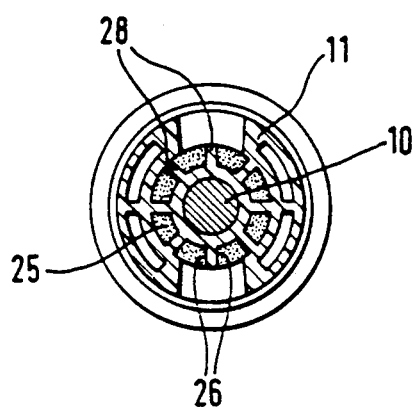
FIG. 2 shows the section along directional arrows A—A of FIG. 1.

The vacuum brake force booster as shown in FIGS. 1 and 2 comprises a booster housing 1 formed by two interconnected housing sections 22, 23 and subdivided by an axially movable partition 2 into a working chamber 3 and a vacuum chamber 4. The axially movable partition 2 consists of a membrane plate 5 deep drawn from sheet metal, and a flexible membrane 6 in abutment therewith (not shown in any detail) and forming between the outer periphery of the membrane plate 5 and the vacuum housing 1 a rolling diaphragm serving as a sealant.

A control valve 9 actuable by a piston rod 8 is provided with a control piston 10 connected to the piston rod 8 and carrying a first valve seat 18, with the said control piston 10 being axially guided in a control valve housing 11 furnished with a second valve seat 19. The two valve seats 18, 19 cooperate with a poppet valve 7 which, through a prestressing sleeve 21, is forced by means of a compression spring 20 supported on the piston rod 8 against the valve seat 18. The working chamber 3, in the non-actuated position as shown, through a passageway 12 laterally extending in the control valve housing 11, is in communication with the vacuum chamber 4.

The brake force, through a rubber-elastic reaction member 13 accommodated in a front-sided recess of the control valve housing 11, and through a push-rod 14 comprising a top flange 15, is transmitted to an actuating piston of a master cylinder (not shown) of the brake system, which is provided on the vacuum-sided end of the brake force booster.

A restoring spring 16 schematically shown in the drawing which, on the vacuum-sided front wall of the booster housing 1, is supported on a flange, holds the movable partition 2 in the initial position as shown. Moreover, a second compression spring 24 is provided which is located between the poppet valve 7 and a shoulder formed on the piston rod 8, with the force thereof providing for a prestressing of the control piston 10 and the first valve seat 18 thereof, respectively vis-a-vis the poppet valve 7.

The housing section 23 confining the ventable working chamber 3, on the inner side thereof, is lined with an attenuating composition 17 that may be provided in the form of a foam coating, preferably a soft foam coating, insulating boards, an insulating lacquer coating or in the form of a self-adhesive flexible foil. The insulating boards may be made up of self-adhesive, flexible, bituminated insulating cardboard whereas an insulating lacquer coating may be a sprayable sound-insulating mass on a caoutchouc and bitumen/caoutchouc basis, respectively. The insulating boards may be retained in their illustrated positions (refer FIG. 1) by sheet metal flaps 29–32.

As illustrated, in particular by FIG. 2, the control valve housing 11, in the guiding area of the valve piston 10, includes intervals 26 spaced from one another by a plurality of reinforcing bridges 28 and equally filled with the attenuating composition and accommodating filter elements 25, respectively.

Figure 3:
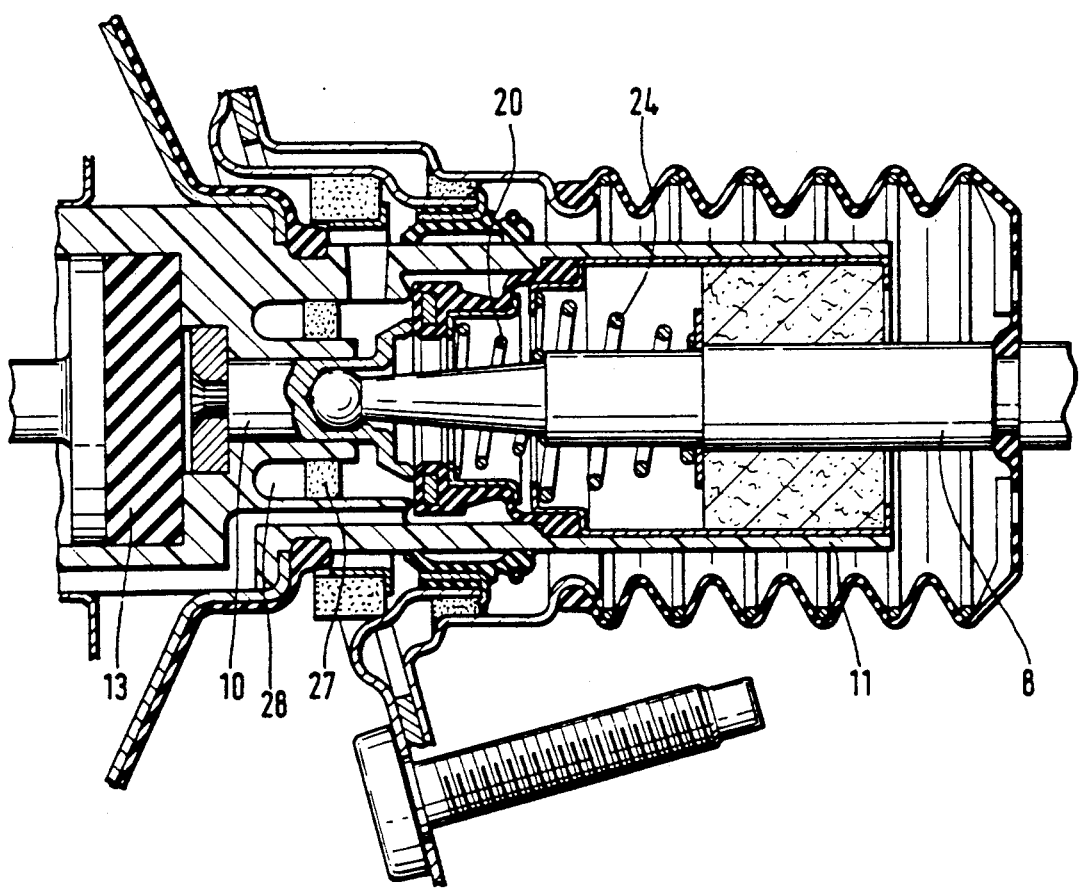
FIG. 3 illustrates a longitudinal section through a control valve housing of another embodiment of the vacuum brake force booster in accordance with the present invention.

In the form of embodiment shown in FIG. 3, the reinforcing bridges 28 are shorter in axial length thereby forming an annular chamber not designated in any closer detail. The said annular chamber, in that form of embodiment, accommodates an annular filter 27 pushed across the guiding area of the control piston 10 and being axially supported on the reinforcing bridges 28.

What is claimed:

1. A vacuum brake force booster for automotive vehicles, comprising a booster housing having at least two housing sections and an axially movable partition sealingly subdividing said booster housing into a vacuum chamber and a ventable working chamber, said force booster further comprising an axially movable control valve housing including a control valve mechanically actuable by a control piston and operatively coupled to said booster housing for alternately communicating the working chamber with the vacuum chamber and the atmosphere, said axially movable control valve housing comprising, in the guiding area of the control piston, a plurality of intervals spaced from one another by radial reinforcing bridges, wherein the housing section defining the ventable working chamber and the intervals define first and second areas for support of insulating composition, respectively, and at least one of said areas is lined with an insulating composition for attenuating noise resulting from inflowing air upon actuation of said vacuum brake force booster.

2. A vacuum brake force booster according to claim 1, characterized in that the insulation composition is a foam material.

3. A vacuum brake force booster according to claim 2 wherein said foam material is a soft foam.

4. A vacuum brake force booster according to claim 2, characterized in that the housing section, at the inner side thereof, is provided with an area of said insulating foam material.

5. A vacuum brake force booster according to claim 4 characterized in that the housing section is provided with sheet metal flaps for fixing the mats of foam material.

6. A vacuum brake force booster according to claim 1 wherein said control valve housing is formed from a thermoplastic resin.

7. A vacuum brake force booster according to claim 1, characterized in that filter elements are provided in the intervals.

8. A vacuum brake force booster according to claim 1, characterized in that the housing section, at the inner side thereof, is lined with boards formed from said insulating composition.

9. A vacuum brake force booster according to claim 8 wherein said insulating boards are formed from self-adhesive, flexible bituminated cardboard.

10. A vacuum force booster according to claim 8 characterized in that the housing section is provided with sheet metal flaps for fixing said insulating boards.

11. A vacuum brake force booster according to claim 1, characterized in that the housing section, at the inner side thereof, is provided with a layer of lacquer forming said insulating composition.

12. A vacuum brake force booster according to claim 11, wherein, said lacquer is a sprayable sound insulating material of a bitumen/caoutchouc base.

13. A vacuum brake force booster according to claim 11, wherein said lacquer is a sprayable sound insulating material of a caoutchouc base.

14. A vacuum brake force booster according to claim 11 wherein said lacquer is a sprayable sound insulating material on a caoutchouc base.

15. A vacuum brake force booster according to claim 1, characterized in that the housing section, at the inner side thereof, is provided with a self-adhesive, flexible foil on a bitumen/caoutchouc base forming said insulating composition.

16. A vacuum brake force booster according to claim 1, characterized in that an annular filter in axial abutment with the reinforcing bridges is provided upstream of the intervals, in the direction of air in-flow.

17. A vacuum brake force booster according to claim 1 wherein said housing section defining said ventable working chamber is lined with said insulating composition.

18. A vacuum brake force booster according to claim 1 wherein said plurality of said intervals of said control valve housing are lined with said insulating composition.

19. A vacuum brake force booster according to claim 1 wherein both said housing section defining said ventable working chamber and said plurality of intervals of said control valve housing are lined with said insulating composition.

20. A vacuum brake force booster as claimed in claim 1 wherein said intervals are cylinder segment shaped.

21. A vacuum brake force booster as claimed in claim 1 wherein both said housing section defining said ventable working chamber and said plurality of intervals are lined with said insulating composition.

22. A vacuum brake force booster for automotive vehicles, comprising a booster housing having at least two housing sections and an axially movable partition sealingly subdividing said booster housing into a vacuum chamber and a ventable working chamber, said force booster further comprising and axially movable control valve housing including a control valve mechanically actuable by a control piston and operatively coupled to said booster housing for alternately communicating the working chamber with the vacuum chamber and the atmosphere, wherein the housing section defining the ventable working chamber is lined with an insulating composition for attenuating noise resulting from inflowing air upon actuation of said vacuum brake force booster.

23. A vacuum brake force booster for automotive vehicles, comprising a booster housing having at least two housing sections and an axially movable partition sealingly subdividing said booster housing into a vacuum chamber and a ventable working chamber, said force booster further comprising an axially movable control valve housing including a control valve mechanically actuable by a control piston and operatively coupled to said booster housing for alternately communicating the working chamber with the vacuum chamber and the atmosphere, said axially movable control valve housing comprising, in the guiding area of the control piston, at least one interval defined in part by radial reinforcing bridges, wherein the housing section defining the ventable working chamber is lined with an insulating composition for attenuating noise resulting from inflowing air upon actuation of said vacuum brake force booster.

* * * * *